(12) United States Patent
Huslak et al.

(10) Patent No.: US 9,350,795 B2
(45) Date of Patent: *May 24, 2016

(54) METHODS, SYSTEMS AND COMPUTER PROGRAM PRODUCTS FOR PROACTIVELY OFFERING A NETWORK TURBO BOOST SERVICE TO END USERS

(75) Inventors: Nicholas S. Huslak, Duluth, GA (US); Arnold C. McQuaide, Jr., Berkeley Lake, GA (US); Sharon E. Carter, Austell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/537,310

(22) Filed: Jun. 29, 2012

(65) Prior Publication Data

US 2012/0265885 A1 Oct. 18, 2012

Related U.S. Application Data

(63) Continuation of application No. 10/719,471, filed on Nov. 21, 2003, now Pat. No. 8,239,516.

(60) Provisional application No. 60/470,650, filed on May 15, 2003.

(51) Int. Cl.
G06F 15/173 (2006.01)
G06F 15/16 (2006.01)
H04L 29/08 (2006.01)

(52) U.S. Cl.
CPC ............... *H04L 67/06* (2013.01); *H04L 67/22* (2013.01); *H04L 67/306* (2013.01); *H04L 67/322* (2013.01)

(58) Field of Classification Search
None
See application file for complete search history.

(56) References Cited

U.S. PATENT DOCUMENTS

| | | |
|---|---|---|
| 4,850,007 A | 7/1989 | Marino et al. |
| 5,459,606 A | 10/1995 | Baranyai et al. |
| 5,513,117 A | 4/1996 | Small |
| 5,557,320 A | 9/1996 | Krebs |
| 5,559,877 A | 9/1996 | Ash et al. |
| 5,847,760 A | 12/1998 | Elmaliach et al. |
| 5,855,008 A | 12/1998 | Goldhaber et al. |
| 6,046,980 A | 4/2000 | Packer |
| 6,304,909 B1 | 10/2001 | Mullaly et al. |
| 6,529,479 B1 | 3/2003 | Suzuki |
| 6,543,053 B1 | 4/2003 | Li et al. |
| 6,594,265 B1 | 7/2003 | Fichou et al. |
| 6,631,118 B1 | 10/2003 | Jones |
| 6,738,348 B1 * | 5/2004 | Rollins .................. 370/230 |
| 6,772,217 B1 | 8/2004 | Baumann et al. |

(Continued)

OTHER PUBLICATIONS

Chaudhury, et al., "Web Channels in E-commerce", Communications on the ACM, Jan. 2001; vol. 44, No. 1 pp. 99-104.

(Continued)

*Primary Examiner* — Scott B Christensen
*Assistant Examiner* — Thomas Richardson
(74) *Attorney, Agent, or Firm* — Cantor Colburn LLP

(57) ABSTRACT

Methods for proactively offering a network turbo boost service to consumers including receiving a set of one or more turbo boost triggering criteria associated with a user. A network is monitored for a task that meets at least one of the turbo boost triggering criteria. If the monitoring results in locating a task that meets at least one of the turbo boost triggering criteria, then the network turbo boost service is invoked for the task.

13 Claims, 3 Drawing Sheets

(56) References Cited

U.S. PATENT DOCUMENTS

| | | | |
|---|---|---|---|
| 6,901,446 B2 | 5/2005 | Chellis et al. | |
| 6,931,444 B2 | 8/2005 | Schweitzer | |
| 6,934,745 B2 | 8/2005 | Krautkremer | |
| 6,975,594 B1* | 12/2005 | Byers | 370/238 |
| 6,976,003 B1 | 12/2005 | Hamor et al. | |
| 7,003,580 B1* | 2/2006 | Cook | 709/235 |
| 7,082,469 B2 | 7/2006 | Gold et al. | |
| 7,113,479 B2* | 9/2006 | Wong | 370/235 |
| 7,116,682 B1* | 10/2006 | Waclawsky et al. | 370/468 |
| 7,124,195 B2 | 10/2006 | Roach et al. | |
| 7,149,892 B2 | 12/2006 | Freed et al. | |
| 7,171,485 B2 | 1/2007 | Roach et al. | |
| 7,383,230 B2 | 6/2008 | Wolff | |
| 7,415,439 B2 | 8/2008 | Kontio et al. | |
| 7,426,537 B2 | 9/2008 | Lee et al. | |
| 7,430,187 B2 | 9/2008 | Holt et al. | |
| 7,444,588 B2 | 10/2008 | Hill et al. | |
| 7,562,032 B2 | 7/2009 | Abbosh et al. | |
| 7,672,874 B2 | 3/2010 | Bezos et al. | |
| 7,680,824 B2 | 3/2010 | Plastina et al. | |
| 2001/0005837 A1 | 6/2001 | Kojo | |
| 2002/0054059 A1 | 5/2002 | Schneiderman | |
| 2002/0077987 A1 | 6/2002 | Hasegawa | |
| 2002/0087696 A1 | 7/2002 | Byrnes | |
| 2002/0103895 A1 | 8/2002 | Chiang | |
| 2002/0116488 A1 | 8/2002 | Subramanian et al. | |
| 2002/0178053 A1 | 11/2002 | Eaker et al. | |
| 2002/0188732 A1* | 12/2002 | Buckman et al. | 709/228 |
| 2003/0005112 A1 | 1/2003 | Krautkremer | |
| 2003/0014462 A1 | 1/2003 | Bennett et al. | |
| 2003/0023721 A1 | 1/2003 | Vinberg | |
| 2003/0023722 A1 | 1/2003 | Vinberg | |
| 2003/0069964 A1 | 4/2003 | Shteyn et al. | |
| 2003/0074439 A1 | 4/2003 | Grabarnik et al. | |
| 2003/0074445 A1 | 4/2003 | Roach et al. | |
| 2003/0074474 A1 | 4/2003 | Roach et al. | |
| 2003/0078939 A1 | 4/2003 | Ma | |
| 2003/0084145 A1 | 5/2003 | Ramachandran et al. | |
| 2003/0084147 A1 | 5/2003 | Gourraud | |
| 2003/0084150 A1 | 5/2003 | Hansen et al. | |
| 2003/0095135 A1 | 5/2003 | Kaasila et al. | |
| 2003/0172033 A1 | 9/2003 | Risan et al. | |
| 2003/0210331 A1 | 11/2003 | Battles et al. | |
| 2003/0229720 A1 | 12/2003 | Kiremidjian et al. | |
| 2003/0233422 A1 | 12/2003 | Csaszar et al. | |
| 2004/0015776 A1 | 1/2004 | Scott | |
| 2004/0064760 A1 | 4/2004 | Hicks et al. | |
| 2004/0091175 A1 | 5/2004 | Beyrouti | |
| 2004/0093513 A1 | 5/2004 | Cantrell et al. | |
| 2004/0098302 A1 | 5/2004 | Feeley | |
| 2004/0100990 A1 | 5/2004 | Chen et al. | |
| 2004/0111308 A1 | 6/2004 | Yakov | |
| 2004/0192324 A1 | 9/2004 | Rudkin | |
| 2004/0199604 A1 | 10/2004 | Dobbins et al. | |
| 2004/0199667 A1 | 10/2004 | Dobbins | |
| 2004/0201752 A1 | 10/2004 | Parulski et al. | |
| 2004/0213221 A1 | 10/2004 | Civanlar et al. | |
| 2004/0215806 A1* | 10/2004 | Brenner et al. | 709/232 |
| 2004/0230678 A1 | 11/2004 | Huslak et al. | |
| 2004/0230683 A1 | 11/2004 | Adamczyk et al. | |
| 2004/0230695 A1 | 11/2004 | Anschutz et al. | |
| 2004/0252698 A1 | 12/2004 | Anschutz et al. | |
| 2005/0015493 A1 | 1/2005 | Anschutz et al. | |
| 2005/0015494 A1 | 1/2005 | Adamczyk et al. | |
| 2005/0021716 A1 | 1/2005 | Adamczyk et al. | |
| 2005/0021739 A1 | 1/2005 | Carter et al. | |
| 2005/0025136 A1 | 2/2005 | Anschutz et al. | |
| 2005/0081155 A1 | 4/2005 | Martin et al. | |
| 2005/0086062 A1 | 4/2005 | Clark et al. | |
| 2005/0091069 A1 | 4/2005 | Chuang | |
| 2006/0020525 A1 | 1/2006 | Borelli et al. | |
| 2006/0025219 A1 | 2/2006 | Nassef, Jr. et al. | |
| 2006/0031770 A1 | 2/2006 | McMenamin | |
| 2006/0208074 A1 | 9/2006 | Eglen et al. | |
| 2007/0100981 A1 | 5/2007 | Adamczyk et al. | |
| 2007/0112956 A1 | 5/2007 | Chapman et al. | |
| 2008/0065997 A1 | 3/2008 | Szeto et al. | |

OTHER PUBLICATIONS

Who We Are: Staff, [online]; [retrieved on Aug. 3, 2007]; retrieved from the Internet http://www.dslforum.org/about/staff.shtml.

Battarbee, "Recording Experience Through Images: Defining Co-Experience" Proceedings of the 2003 International Conference on Designing Pleasurable Products and Interfaces, Jun. 2003, pp. 109-113,DPPI '03.

Bellsouth Teams With Myway.Com to Launch Next Generation Internet Portal, [online]; [retrieved on Oct. 30, 2007]; retrieved from the Internet http://findarticles.com/articles/mi_mOEIN/is_1999-Dec 8/ai58113-652-08/03/0006.

Blake et al.; "An Architecture for Differentiated Services"; Online Retrieved Oct. 30, 2007; retrieved from http://www.ietf.org/rfc/rfc2475.txt.

DSL Evolution—Architecture Requirements for the Support of QoS—Enabled IP Services for Architecture and Transport Working Group—DSL Forum Proposed Draft—Rev. 1.0—Aug. 2002.

DSL Evolution—Architecture Requirements for the Support of QoS—Enabled IP Services for Architecture and Transport Working Group—DSL Forum Working Text WT-081—Rev. 4—Dec. 2002.

DSL Evolution—Architecture Requirements for the Support of QoS—Enabled IP Services for Architecture and Transport Working Group—DSL Forum Working Text WT-081—Straw Ballot Revision (7)—Mar. 2003.

DSL Evolution—Architecture Requirements for the Support of QoS—Enabled IP Services for Architecture and Transport Working Group—DSL Forum Working Text WT-081—Straw Ballot Revision (8)—Mar. 2003.

DSL Evolution—Architecture Requirements for the Support of QoS—Enabled IP Services for Architecture and Transport Working Group—DSL Forum Working Text WT-081—Letter Ballot Revision (9)—Jun. 2003.

DSL Evolution—Architecture Requirements for the Support of QoS—Enabled IP Services for Architecture and Transport Working Group—DSL Forum Working Text WT-081—Rev. 5—Feb. 2003.

DSL Evolution—Architecture Requirements for the Support of QoS—Enabled IP Services for Architecture and Transport Working Group—DSL Forum Working Text WT-081—Rev. 6—Mar. 2003.

Anschutz et al., DSL Forum, DSL Evolution-Architecture Requirements for the support of QoS-Enabled IP Services, Technical Report: TR-059, Sep. 2003.

Technical Report—DSL Forum—TR-059—DSL Evolution—Architecture Requirements for the Support of QoS-Enabled IP Services—Sep. 2003, 53 pages.

* cited by examiner

METHODS, SYSTEMS AND COMPUTER PROGRAM PRODUCTS FOR PROACTIVELY OFFERING A NETWORK TURBO BOOST SERVICE TO END USERS

RELATED APPLICATION

This application is a continuation application of U.S. application Ser. No. 10/719,471 filed on Nov. 21, 2003. Application Ser. No. 10/719,471 claims the benefit of and priority to U.S. Provisional Patent Application No. 60/470,650, filed May 15, 2003, the disclosure of both of which are hereby incorporated by reference in their entirety.

FIELD OF THE INVENTION

The present disclosure relates generally to a method of proactively offering a network turbo boost service to end users and in particular, to a method of proactively offering a network turbo boost service to end users when pre-selected triggering events occur.

BACKGROUND OF THE INVENTION

Increasing amounts and types of information are becoming available via networks such as the Internet and various types of networks that allow access to the Internet, such as DSL networks and cable television networks. Consumers are downloading files to their personal computers and/or to their personal networks that contain information such as voice data, graphics data, audio-visual multimedia data (e.g., television programs, movies, audio) and other types of data. As the files consumers are downloading have become larger and larger in size, several corporations have introduced products aimed at reducing the amount of time it takes to download large files. Examples of such products include WebRocket and ActiveSpeed Internet Accelerator from Ascentive. These products are aimed at increasing the efficiency of the download process by optimizing the download from the user side of the process (e.g., personal computer and/or personal network). In addition, there are other manners of expediting the download process, such as utilizing a multi-link environment that is supported by some Internet Service Providers (ISPs). The multi-link environment includes a user system (e.g., personal computer) that contains two modems and two telephone lines connected to the modems, which in turn are in communication with the ISP. In this manner, data may be downloaded at about twice the speed of a single modem.

ISPs are beginning to offer broadband "turbo boost" services that offer temporary access to improved transmission for a limited time in exchange for a per-use or standing fee. The improved transmission vehicle is typically an increase in potential bandwidth. Once a user subscribes to the service, such existing services are typically triggered by simple mechanisms such as: providing the turbo boost to all communications during a specified time period; or providing turbo boost whenever the user accesses a particular destination address or set of destination addresses specified by the user.

SUMMARY OF THE INVENTION

Embodiments of the invention include a method for proactively offering a network turbo boost service. The method includes receiving a set of one or more turbo boost triggering criteria associated with a user. A network is monitored for a task that meets at least one of the turbo boost triggering criteria. If the monitoring results in locating a task that meets at least one of the turbo boost triggering criteria, then the network turbo boost service is invoked for the task.

Other embodiments include a method for proactively offering a network turbo boost service. The method includes receiving a set of one or more turbo boost triggering criteria associated with a user. A network is monitored for a task that meets at least one of the turbo boost triggering criteria. If the monitoring results in locating a task that meets at least one of the turbo boost triggering criteria, then an offer is transmitted to the user to invoke the network turbo boost service for the task. The network turbo boost service is invoked for the task if the user responds to the offer by requesting that the network turbo boost service be invoked for the task.

Other embodiments of the invention include a method for proactively offering a network turbo boost service. The method includes receiving at least one of a set of one or more turbo boost offer triggering criteria and a set of one or more turbo boost automatic triggering criteria associated with a user. A network is monitored for a task that meets at least one of the turbo boost offer triggering criteria or at least one of the turbo boost automatic triggering criteria. If the monitoring results in locating a task that meets at least one of the turbo boost offer triggering criteria, then an offer is transmitted to the user to invoke the network turbo boost service for the task. The network turbo boost service is invoked for the task if the user responds to the offer by requesting that the network turbo boost service be invoked for the task. If the monitoring results in locating a task that meets at least one of the turbo boost automatic triggering criteria, then the network turbo boost service is invoked for the task that meets the automatic triggering criteria.

Additional embodiments include a system for proactively offering a network turbo boost service. The system includes a network and a service provider (such as an Internet Service Provider) system in communication with the network. The service provider system includes instructions to implement a method including receiving a set of one or more turbo boost triggering criteria for a user via the network. The network is monitored for a task that meets at least one of the turbo boost triggering criteria. If the monitoring results in locating a task that meets at least one of the turbo boost triggering criteria, then an offer is transmitted to the user via the network to invoke the network turbo boost service for the task. The network turbo boost service is invoked for the task if the user responds to the offer by requesting that the network turbo boost service be invoked for the task.

Further embodiments include a computer program product for proactively offering a network turbo boost service. The computer program product includes a storage medium readable by a processing circuit and storing instructions for execution by the processing circuit for performing a method including receiving a set of one or more turbo boost triggering criteria associated with a user. A network is monitored for a task that meets at least one of the turbo boost triggering criteria. If the monitoring results in locating a task that meets at least one of the turbo boost triggering criteria, then an offer is transmitted to the user to invoke the network turbo boost service for the task. The network turbo boost service is invoked for the task if the user responds to the offer by requesting that the network turbo boost service be invoked for the task.

Other systems, methods, and/or computer program products according to embodiments will be or become apparent to one with skill in the art upon review of the following drawings and detailed description. It is intended that all such additional systems, methods, and/or computer program products be

DETAILED DESCRIPTION OF THE INVENTION

Exemplary embodiments of the present invention allow a service provider to present an option to an end user to utilize "turbo boost" when certain pre-specified "triggering" events or criteria are encountered. Examples of such triggering events include (but are not limited to): a manual end user request; a request from desktop client software in response to excessive time for a file transfer; a request from an application; the detection of a destination address for which high speed transfer might be recommended; and the detection of large files to be transferred. In addition, exemplary embodiments of the present invention may be utilized to automatically invoke turbo boost capability (without first offering it as an option to the end user) when pre-specified triggering events are detected. The list of triggering events may be created by a service provider and/or by a user.

Exemplary embodiments of the present invention allow a user to select from a variety of network turbo boost service triggering mechanisms. This enables the user to control the conditions under which the turbo boost option is presented. This may cause the network turbo boost service to be utilized more often and lead to increased revenues for the service provider. Exemplary embodiments of the present invention may be utilized in combination with any type of broadband access (e.g., cable, wireline DSL, wireless DSL, satellite).

Triggers may be network-based, user client-based, or application-based. Network-based triggers include detection of large files or specific application addresses potentially requiring network turbo boost services. Client-based triggers include manual user requests for turbo boost, the detection of large files to be uploaded (e.g., photographs), or the detection of a large file transfer time. Application-based triggers may be utilized when an application recognizes the need for high transfer speed (e.g., based on the size of a file to be downloaded or based on anticipated streaming video content). In exemplary embodiments of the present invention, the service provider provides a list of suggested triggering mechanisms that a user may add to their network turbo boost service triggering preference list. These triggering mechanisms may cause the network turbo boost option to be presented to the end user for user initiation or they may cause the network turbo boost service to be automatically initiated when the trigger event is detected. In alternate exemplary embodiments of the present invention, the service provider defines a list of triggering mechanisms. In other alternate exemplary embodiments of the present invention, an application provider system may cause the turbo boost option to be presented to the user or to be initiated.

Figure 1:
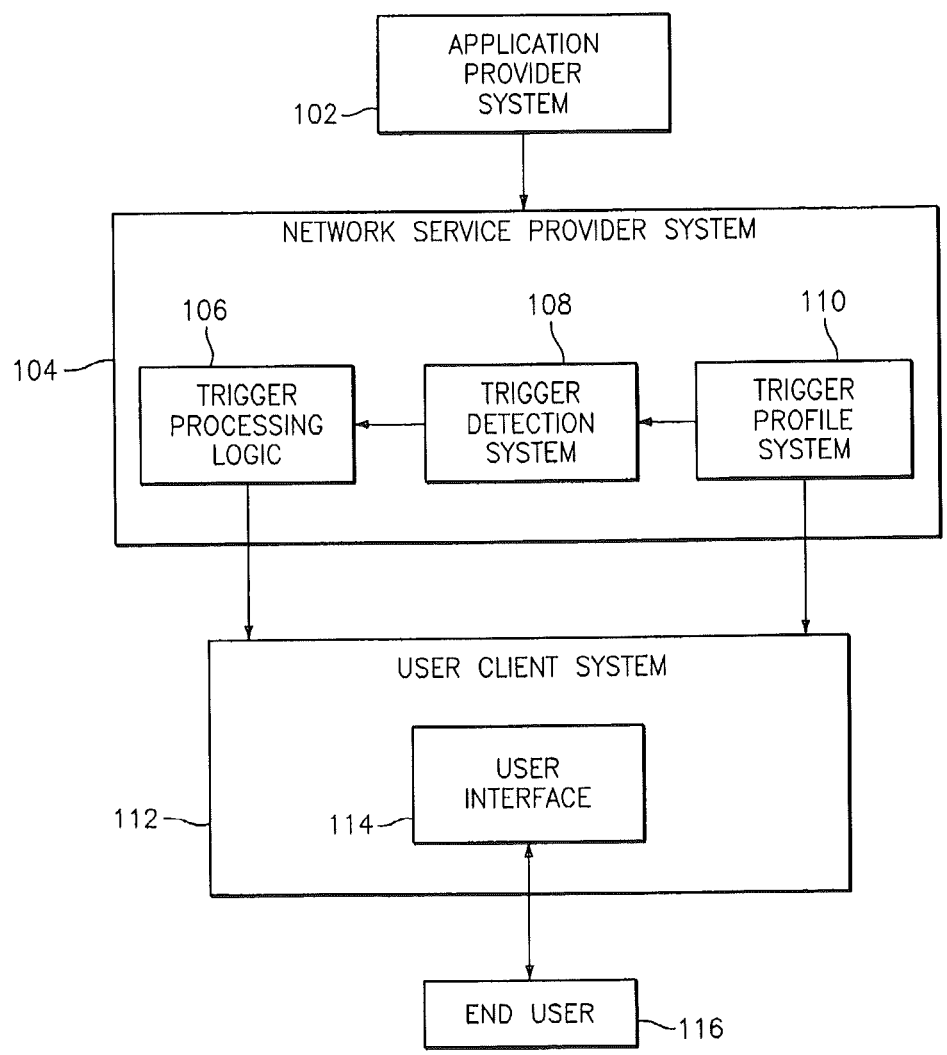
FIG. 1 is a block diagram of an exemplary system for proactively offering a network turbo boost service to users.

FIG. 1 is a block diagram of an exemplary system for proactively offering a network turbo boost service to an end user 116. The system includes an end user 116 accessing a user client system 112. In exemplary embodiments of the present invention, the user client system 112 is a personal computer that is in communication with the service provider system 104 via a network. The user client system 112 includes a user interface 114 that is presented to the end user 116. The user interface 114 allows the end user 116 to specify trigger events to be stored in a trigger profile system 110. The user interface 114 also allows the end user 116 to be presented with the option of invoking the network turbo boost service and to select the network turbo boost service.

The user interface 114 may display information to the end user 116 in a text and/or graphic format. In exemplary embodiments of the present invention, the text may be utilized to notify the end user 116 that the network turbo boost service is available and then allow the end user 116 to select an input button to invoke the service. In alternate exemplary embodiments of the present invention, the user interface 114 may display a green graphic for the end user 116 to select to invoke the turbo boost service and a red graphic for the end user 116 to select to decline invoking the network turbo boost service. The user interface 114 also allows the end user 116 to manually select the network turbo boost service for a particular network operation (e.g., a file download).

The system depicted in FIG. 1 also includes a service provider system 104 that includes trigger processing logic 106, a trigger detection system 108 and a trigger profile system 110. The trigger profile system 104 includes user and service provider triggering preference lists. Different end users 116 may have different triggering preference lists. As described previously, the triggering preference lists include information about when to offer the network turbo boost service to a user. In addition, the triggering preference list includes information about when to automatically initiate the network turbo boost service for a user. The trigger detection system 108 monitors the service provider network to determine what kind of signals are coming from the end user 116 and/or the service provider network. When the trigger detection system 108 detects a trigger event, it invokes the trigger processing logic 106.

An example of a trigger event that may be detected by the trigger detection system 108 is an end user 116 uploading a large file. Once the file is recognized as a large file (e.g., over a pre-selected size) by the trigger detection system 108, the trigger processing logic 106 is invoked to offer the option of using the network turbo boost service to the end user 116. Alternatively, the preference list corresponding to the end user 116 may specify that the network turbo boost service be invoked without first checking with the end user 116 because the file is very large (e.g., over a second pre-selected size). In another example, an end user 116 may be in a hurry to download a particular file and may manually request that the network turbo boost service be invoked. In this case, the trigger detection system 108 would detect the manual request trigger and automatically invoke the network turbo boost service.

The trigger processing logic 106 presents the option of using the network turbo boost service to the end-user 116. As discussed previously, the end-user 116 interacts with the trigger processing logic 106 via the user interface 114 located on the user client system 112 to invoke the network turbo boost service.

FIG. 1 also includes an application provider system 102 resident on or in communication with the service provider system 104. The application provider system 102 can request that the network turbo boost service be offered to an end user 116. In order to do this, a request from the application provider system 102 would be included in a triggering preference list located in the trigger profile system 110. The trigger detection system 108 would then detect the request from the application provider system 102. This would cause the trigger processing logic 106 to either offer the network turbo boost service to the end user 116 or to automatically initiate the network turbo boost service. Which action the trigger processing logic 106 takes depends on what is specified in the trigger profile system 110 for the particular trigger and application provider system 102.

Figure 2:
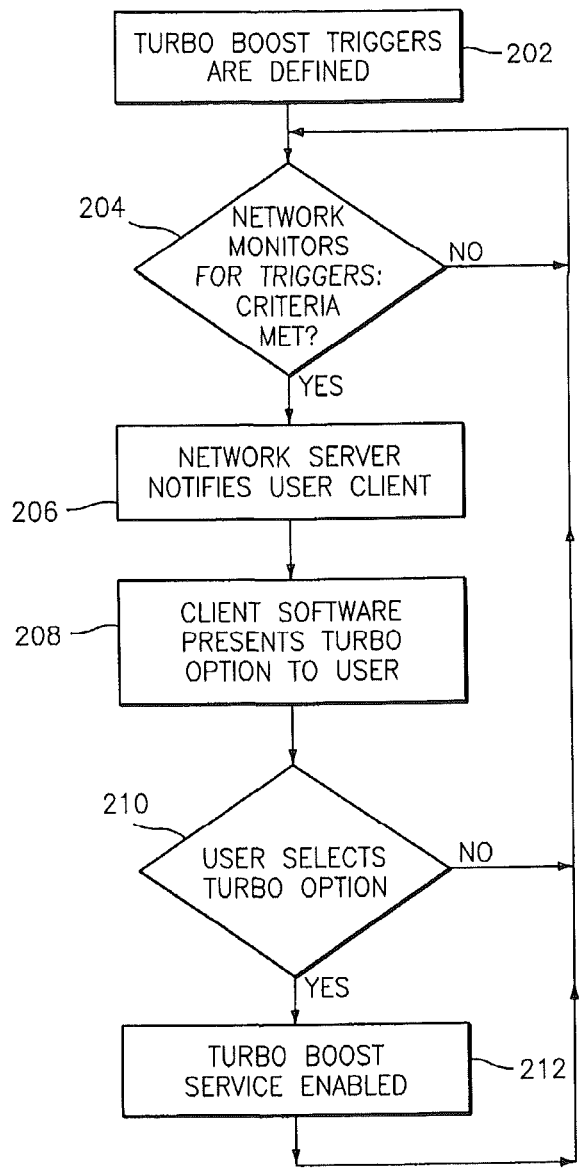
FIG. 2 depicts an exemplary process by which a user may be presented with an option to utilize a network turbo boost service in accordance with exemplary embodiments of the present invention.

FIG. 2 depicts an exemplary process by which a user may be presented with an option to utilize a network turbo boost service in accordance with exemplary embodiments of the present invention. At step 202, turbo boost triggers are defined. This may be performed by the service provider and/or by the end user 116. As an example, the triggering preferences may be set up by the end user 116 by entering, via the user interface 114, specific destination addresses (e.g., a gaming application address, a video conferencing address). When the end user 116 accesses these destination addresses, the end user 116 is presented with the option of invoking the network turbo boost service. In exemplary embodiments of the present invention, the end user 116 is presented with a portal to set triggering preferences from a list displayed via the user interface 114. In addition to destination addresses, additional triggering options may be presented to the end user 116 via the user interface 114. In exemplary embodiments of the present invention, these additional options may include being notified: when a large incoming file is detected; when a large outgoing file is detected; when a destination address is on a list of high transmission rate applications (e.g., video conferencing sites, gaming sites); and/or when a request is received from an application that typically requires downloading of application code data (e.g., service packs, software updates). In response to the user entering and/or selecting the triggering preferences, the triggering preferences are stored in the trigger profile system 110.

At step 204, the trigger detection system 108 monitors the service provider network for events, or tasks, that correspond to the trigger events contained in the end user's 116 trigger preference list located on the trigger profile system 110. Step 204 continues to be performed until a trigger event is detected. When a trigger event is detected, step 206 is performed and the trigger processing logic 106 notifies the user client system 112 that a trigger event has occurred. At step 208, software located on the user client system 112 presents an option to invoke the network turbo boost service for the trigger event, or task, to the end user 116. If the end user 116 does not select the network turbo boost service, as determined at step 210, then the task associated with the trigger event is performed without the network turbo boost service and processing continues at step 204. In exemplary embodiments of the present invention, if the user does not select the turbo boost option, as presented at step 208, within a pre-selected period of time (e.g., two minutes, five minutes) then it is assumed that the end user 116 does not want to enable the network turbo boost service. In this case, the task associated with the trigger event is performed without the network turbo boost service and processing continues at step 204. This feature may be utilized to prevent the suspension of all activity towards completing the task associated with the trigger event until the end user 116 takes an action at step 210. If it is determined at step 210 that the end user 116 has selected the network turbo boost service option, then step 212 is performed and the network turbo boost service is enabled for the task associated with the trigger event.

Figure 3:
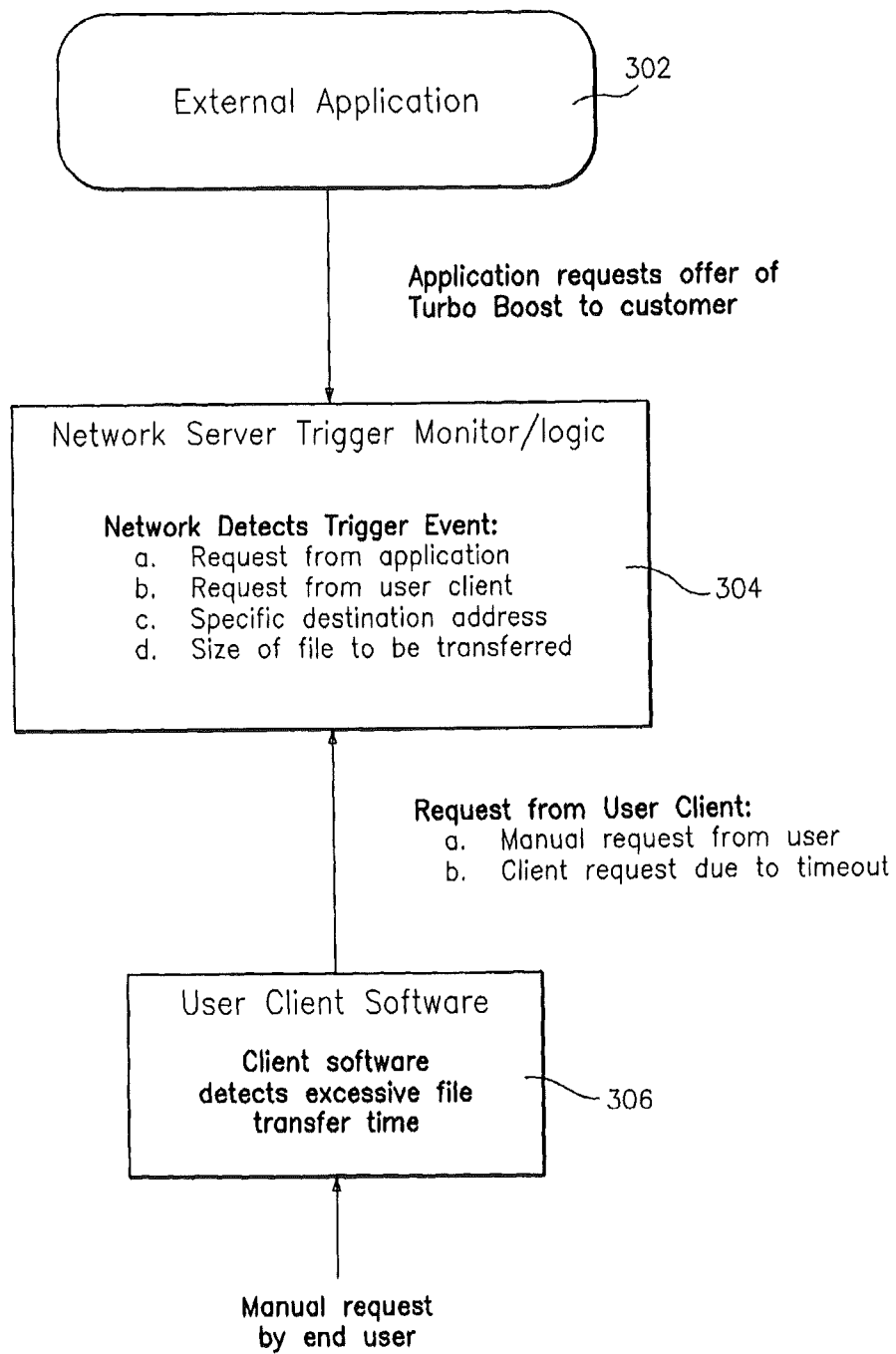
FIG. 3 is a block diagram of illustrative triggers that may be utilized by exemplary embodiments of the present invention.

FIG. 3 is a block diagram of illustrative triggers that may be supported by exemplary embodiments of the present invention. The service provider system 104 includes the trigger detection system 108 that seeks to detect the trigger events listed in the service provider trigger monitor/logic box 304. The first type of trigger event that may be detected by the trigger detection system 108 is a request from an application. This occurs if an external application 302 requests that the network turbo boost service be offered to an end user 116 or that the network turbo boost service be invoked directly. The second kind of trigger event listed in the service provider trigger monitor/logic box 304 is a request from a user client. This kind of trigger event occurs if the user client software 306 located on the user client system 112 sends a message that the end user 116 has manually requested that the network turbo boost service be invoked. In addition, this type of trigger event may occur if the client software 306 detects excessive file transfer time (or a timeout has occurred) and because of this the user client software 306 requests that the network turbo boost service option be presented to the end-user 116.

A third type of trigger event listed in the service provider trigger monitor logic box 304 is where a specific destination address is accessed. For example, the preference list may specify a Microsoft operating system software update address that is typically utilized to distribute operating system software updates. These update files may usually be quite large and therefore, the end-user 116 is to be presented with an option to use the network turbo boost service whenever this site is accessed. A fourth type of trigger event occurs when the size of a file to be transferred is larger than a pre-selected size limit. Other types of triggering events are possible and the trigger events described in reference to FIG. 3 are meant to be examples of some types of triggering events. Any triggering events known in the art may be utilized by exemplary embodiments of the present invention.

In exemplary embodiments of the present invention, default preference lists may be initially defined by a service provider. These default preference lists may include instructions on whether to automatically invoke a network turbo boost service for the associated task when a trigger event occurs or whether to present the end user 116 with an option to invoke the network turbo boost service for the associated task when the trigger event occurs. In exemplary embodiments of the present invention, some, all or none of the trigger events in the default preference list may be modifiable by a user. Additional trigger events may be added to the default preference list and kept for a specific user in the trigger profile system. By not allowing a user to modify all of the default trigger events, the service provider can maintain some control over when the network turbo boost service is offered to a user.

Utilizing exemplary embodiments of the present invention may provide benefits to end users by increasing the frequency of network turbo boost service invocation resulting is a decrease in elapsed processing time. In addition, the service provider may receive an increased revenue stream as a result of proactively offering the invocation of the network turbo boost service to current and potential customers.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
receiving triggering criteria at a service provider system computer, a first portion of the triggering criteria defined by an end user of a network turbo boost service through a user interface, the triggering criteria defined by an end user include conditions for invoking the network turbo boost service and conditions for offering invocation of the network turbo boost service to the end user;
wherein the first portion of the triggering criteria defined by the end user includes an address of a file accessible to the user via the application provider system, and a task comprising detection of the address entered by the user;
wherein a second portion of the triggering criteria is defined by a service provider of the service provider system computer, the second portion of the triggering criteria defined by the service provider is stored in a default preference list, wherein some of the triggering criteria in the default preference list are modifiable by the end user, and others of the triggering criteria in the default preference list are not modifiable by the end user;
receiving a request from an application provider system to provide the network turbo boost service to the end user for an application that is accessible from the application provider system;
storing information relating to the application provider system as part of the triggering criteria;
monitoring, at the service provider system computer, a network for a task that meets the first or second triggering criteria; and
based on the monitoring resulting in locating a task meeting the first or second triggering criteria for invoking the network turbo boost service, automatically invoking by the service provider system computer the network turbo boost service for the task, the network turbo boost service including providing temporary access to a transmission vehicle configured to increase bandwidth for executing the task;
based on the monitoring resulting in locating a task meeting the first or second triggering criteria for offering the network turbo boost service, providing by the service provider system computer an offer to the end user to invoke the network turbo boost service.

2. The method of claim 1, wherein the network-based trigger is invoked when a file that exceeds a predefined threshold in size is detected.

3. The method of claim 1, wherein the network-based trigger is invoked when an application requests a download of application code data.

4. The method of claim 1, wherein the task includes downloading data from a website.

5. The method of claim 1, wherein the triggering criteria includes a network-based trigger, and the network-based trigger is invoked when a destination address is on a list of high transmission rate applications.

6. A system, comprising:
a memory comprising computer-executable instructions;
a service provider system computer executing the computer-executable instructions, the computer-executable instructions, when executed by the service provider system computer, cause the service provider system computer to perform operations comprising:
receiving triggering criteria, a first portion of the triggering criteria defined by an end user of a network turbo boost service through a user interface, the triggering criteria defined by an end user include conditions for invoking the network turbo boost service and conditions for offering invocation of the network turbo boost service to the end user;
wherein the first portion of the triggering criteria defined by the end user includes an address of a file accessible to the user via the application provider system, and a task comprising detection of the address entered by the user;
wherein a second portion of the triggering criteria is defined by a service provider of the service provider system computer, the second portion of the triggering criteria defined by the service provider is stored in a default preference list, wherein some of the triggering criteria in the default preference list are modifiable by the end user, and others of the triggering criteria in the default preference list are not modifiable by the end user;
receiving a request from an application provider system to provide the network turbo boost service to the end user for an application that is accessible from the application provider system;
storing information relating to the application provider system as part of the triggering criteria;
monitoring a network for a task that meets the first or second triggering criteria; and
based on the monitoring resulting in locating a task meeting the first or second triggering criteria for invoking the network turbo boost service, automatically invoking the network turbo boost service for the task, the network turbo boost service including providing temporary access to a transmission vehicle configured to increase bandwidth for executing the task;
based on the monitoring resulting in locating a task meeting the first or second triggering criteria for offering the network turbo boost service, providing by the service provider system computer an offer to the end user to invoke the network turbo boost service.

7. The system of claim 6, wherein the network-based trigger is invoked when a file that exceeds a predefined threshold in size is detected.

8. The system of claim 6, wherein the network-based trigger is invoked when an application requests a download of application code data.

9. A computer program product embodied on a non-transitory computer readable medium, the computer program product including instructions that, when executed by a computer, cause the computer to perform operations comprising:

receiving triggering criteria, a first portion of the triggering criteria defined by an end user of a network turbo boost service through a user interface, the triggering criteria defined by an end user include conditions for invoking the network turbo boost service and conditions for offering invocation of the network turbo boost service to the end user;

wherein the first portion of the triggering criteria defined by the user includes an address of a file accessible to the user via the application provider system, and a task comprising detection of the address entered by the user;

wherein a second portion of the triggering criteria is defined by a service provider of the network turbo boost service, the second portion of the triggering criteria defined by the service provider is stored in a default preference list, wherein some of the triggering criteria in the default preference list are modifiable by the user, and others of the triggering criteria in the default preference list are not modifiable by the user;

receiving a request from an application provider system to provide the network turbo boost service to the end user for an application that is accessible from the application provider system;

storing information relating to the application provider system as part of the triggering criteria;

monitoring a network for a task that meets the first or second triggering criteria; and based on the monitoring resulting in locating a task meeting the first or second triggering criteria for invoking the network turbo boost service, automatically invoking the network turbo boost service for the task, the network turbo boost service including providing temporary access to a transmission vehicle configured to increase bandwidth for executing the task;

based on the monitoring resulting in locating a task meeting the first or second triggering criteria for offering the network turbo boost service, providing by the service provider system computer an offer to the end user to invoke the network turbo boost service.

10. The computer program product of claim 9, wherein the triggering criteria includes a network-based trigger.

11. The computer program product of claim 10, wherein the network-based trigger is invoked when a file that exceeds a predefined threshold in size is detected.

12. The computer program product of claim 10, wherein the network-based trigger is invoked when an application requests a download of application code data.

13. The computer program product of claim 9, wherein the task includes downloading data from a website.

* * * * *